(12) United States Patent
Bovee

(10) Patent No.: US 7,524,056 B2
(45) Date of Patent: Apr. 28, 2009

(54) EYEGLASSES WITH MID-TEMPLE HINGE

(76) Inventor: John Bovee, 3444 Signet Dr., Waterford, MI (US) 48329

( * ) Notice: Subject to any disclaimer, the term of this patent is extended or adjusted under 35 U.S.C. 154(b) by 0 days.

(21) Appl. No.: 11/801,225

(22) Filed: May 9, 2007

(65) Prior Publication Data

US 2007/0279583 A1 Dec. 6, 2007

Related U.S. Application Data

(60) Provisional application No. 60/801,112, filed on May 17, 2006.

(51) Int. Cl.
*G02C 5/14* (2006.01)

(52) U.S. Cl. .......................... 351/120; 351/63; 351/119; 351/153

(58) Field of Classification Search ................. 351/118, 351/119, 120, 111, 153, 63, 41; 16/228; 2/431
See application file for complete search history.

(56) References Cited

U.S. PATENT DOCUMENTS

| 1,174 | A | | 6/1839 | Thaxter |
| 264,574 | A | | 9/1882 | Shone |
| 1,854,060 | A | | 4/1932 | Pettersson |
| 2,172,959 | A | | 9/1939 | Hirtenstein |
| 2,609,538 | A | | 9/1952 | Jackson |
| 3,252,747 | A | | 5/1966 | Robins |
| 4,367,929 | A | * | 1/1983 | Fortini ......................... 351/119 |
| 5,009,496 | A | | 4/1991 | Holtan, Jr. et al. |
| 5,289,592 | A | * | 3/1994 | Paivarinta ..................... 2/431 |
| 6,086,200 | A | | 7/2000 | Wang-Lee |
| 6,332,681 | B1 | | 12/2001 | Li |
| 6,728,974 | B2 | | 5/2004 | Wadsworth |
| 6,767,095 | B1 | | 7/2004 | Altelaar et al. |
| 6,776,483 | B1 | * | 8/2004 | Wu ............................ 351/120 |
| 7,011,406 | B1 | | 3/2006 | Kim |

FOREIGN PATENT DOCUMENTS

FR 2609559 1/1987

* cited by examiner

*Primary Examiner*—Hung X Dang
(74) *Attorney, Agent, or Firm*—The Weintraub Group, PLC

(57) ABSTRACT

An eyeglass structure includes a lens frame and a pair of articulated temples mounted by a respective first hinge pin to one and the other side of the frame, the temples rotating relative to the pin and about a first axis towards and away from one another. The articulated temples each include forward and rearward sections having mating portions that are frictionally engaged and a second hinge pin that connects the sections together for rotation about a second axis, transverse to the first axis thereof, and between a first in use position, wherein the lenses and frame are in position with the eyes, and a stored second position, wherein the lenses and frame are moved up and away from the eyes and seated on the forehead. The second hinge pin operates to increase the frictional gripping force between the mating portions to maintain the sections in a desired angle to one another.

15 Claims, 3 Drawing Sheets

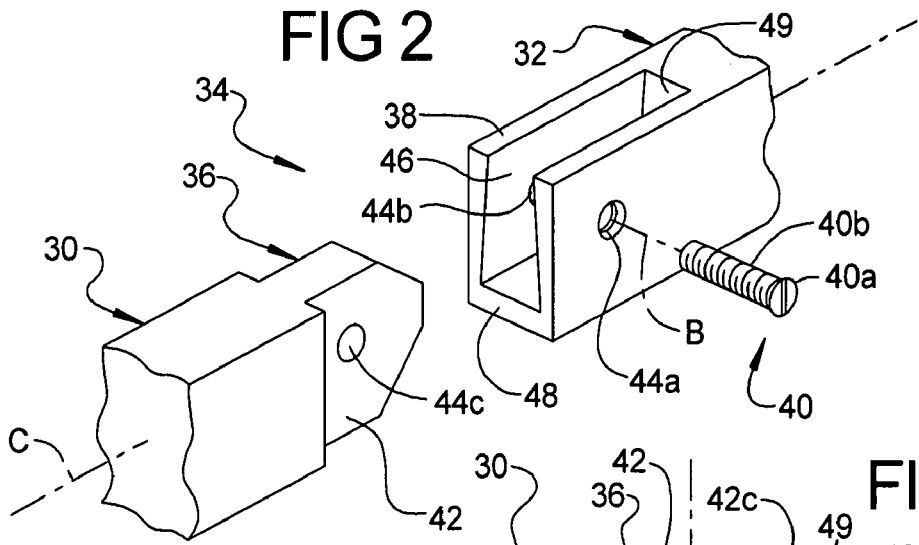
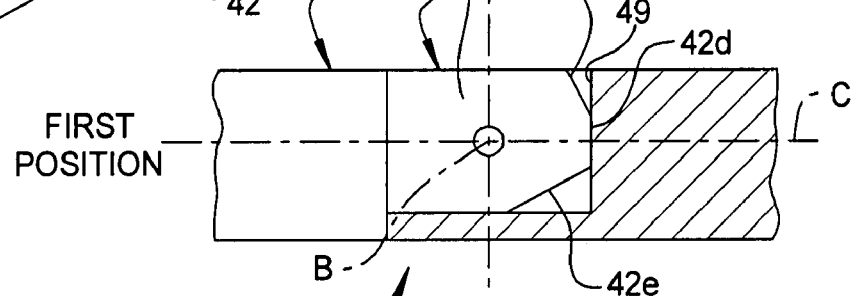
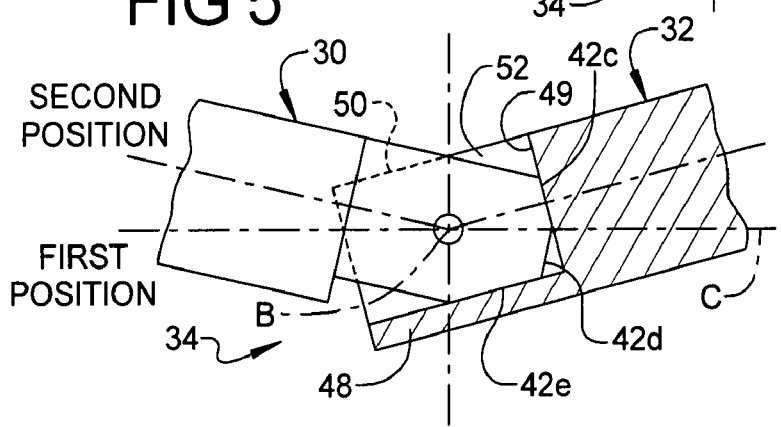
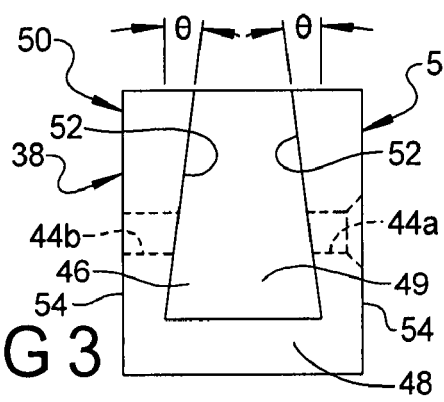
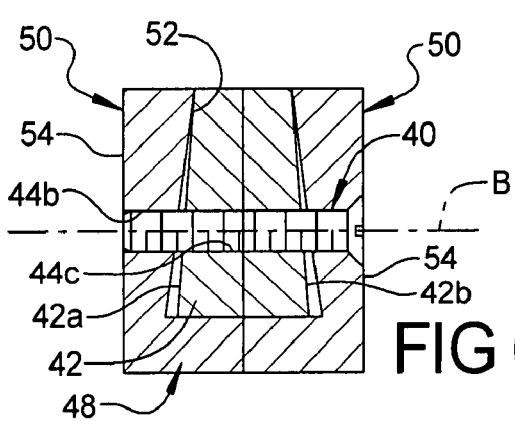

EYEGLASSES WITH MID-TEMPLE HINGE

CROSS REFERENCE TO RELATED APPLICATIONS

This application claims the benefit of U.S. Provisional Application Ser. No. 60/801,112, filed May 17, 2006, the entire disclosure of which hereby incorporated herein by reference.

BACKGROUND OF THE INVENTION

1. Field of the Invention

This invention relates to an eyeglass-adjusting device, and more particularly, to a mid-temple hinge arrangement wherein to permit the eyeglass lenses to be moved upwardly and away from normal relationship with the eyes of the wearer.

2. Description of the Prior Art

A conventional eyeglass consists of a frame, and a pair of temples, and is mounted on the human head in a manner that like end portions of the temples fit about the ears of the wearer and against the sides of the head, a mid-portion of the frame is supported atop the nose, and lenses retained in the frame are juxtaposed with and in front of the wearer's eyes.

Constant wearing of the eyeglass places weight on the nose and may in some cases lead to eyestrain. The weight of the frame may lead to discomfort such as headaches and wearing of the skin. Pressure on the nose may lead to congestion.

Many solutions have been proposed for an eyeglass arrangement, which is simple and yet addresses the need of the user in having lens available for vision and reading when needed.

Among the solutions, are headbands, such as used by miners, dentists and the like wherein a light and eyepiece may be used to increase the visibility of a work area. These are unsightly. Typically, the wearer of eyeglasses is desirous that the eyeglass be as unobtrusive as is possible.

Further, the user oftentimes does not want to remove the eyeglass. While such removal may reduce pain and fatigue, such removal increases the likelihood if inadvertently stepping or sitting on the glasses, or mislaying them.

There is a need for an eyeglass that addresses the need for the wearer of an eyeglass with an arrangement that enables the lenses and their retainer frame to be removed from operable relation with the eyes, seated atop the nose, and in a manner that obviates the dangers of removing the eyeglasses entirely.

SUMMARY OF THE INVENTION

According to this invention, there is provided an eyeglass structure adapted to be worn on a human head, comprising a lens frame having first and second sides disposed laterally and a medial bridge for supporting the frame on the nose and positioning the lenses with the eyes of the wearer, a pair of adjustable temple members, each temple member having forward and rearward sections, means for hingedly connecting the temple member to the frame, and a hinge structure connecting the sections to one another wherein the temples may pivot between a first in use position wherein the frame juxtaposes the lenses with the eyes and a second stored position wherein the frame is seated against the forehead and the lenses above the eyes.

According to this invention, the hinge structure the temple sections including mating end portions, and a pin for connecting the mating end portions together and providing a pivot connection between the sections.

Further, the hinge structure includes means for maintaining the mating end portions in the first and second position when pivoted thereto. In this regard, one mating end portion is in the form of a male member adapted to nest within a socket formed in the other mating end portion, the interfitment being a frictional engagement wherein surfaces of the socket and male member resist pivoting rotation.

Preferably, the hinge structure is medially of the temple.

In one embodiment, the socket comprises a U-shaped recess formed by a pair of sidewalls and the male member comprises an elongated plate, the sidewalls forming a pair of plate engaging surfaces that angle towards one another wherein to grip the plate at any angle of rotation. The plate engaging surfaces are at an angle sufficient to form a narrowed section for gripping a portion of the plate surfaces, such as about 5° relative to a vertical extending from a base of the socket.

In one embodiment, the temple sections are axially elongated and each has a central axis, the axes being aligned in the first position and forming a knee wherein the axes are at an angle of about 160° to 170° in the second position.

For a more complete understanding of the present invention, reference is made to the following detailed description and accompanying drawings. In the drawings, like reference characters refer to like parts throughout the several views, in which:

BRIEF DESCRIPTION OF THE DRAWINGS

FIG. 2 is an exploded perspective view of the mid-temple hinge structure according to the present invention.

FIG. 3 is an end elevation view of one section of the mid-temple hinge structure illustrated in FIG. 2.

FIGS. 4-5 show the mid-temple hinge structure of this present invention operating to permit the temples to be positioned, respectively, in first and second positions relative to a central longitudinal axis through the respective temple according to this invention.

FIG. 6 is a section view taken along line 6-6 of FIG. 1 illustrating two mating sections of the mid-temple hinge structure in the first position.

DETAILED DESCRIPTION OF THE INVENTION

Figure 1:
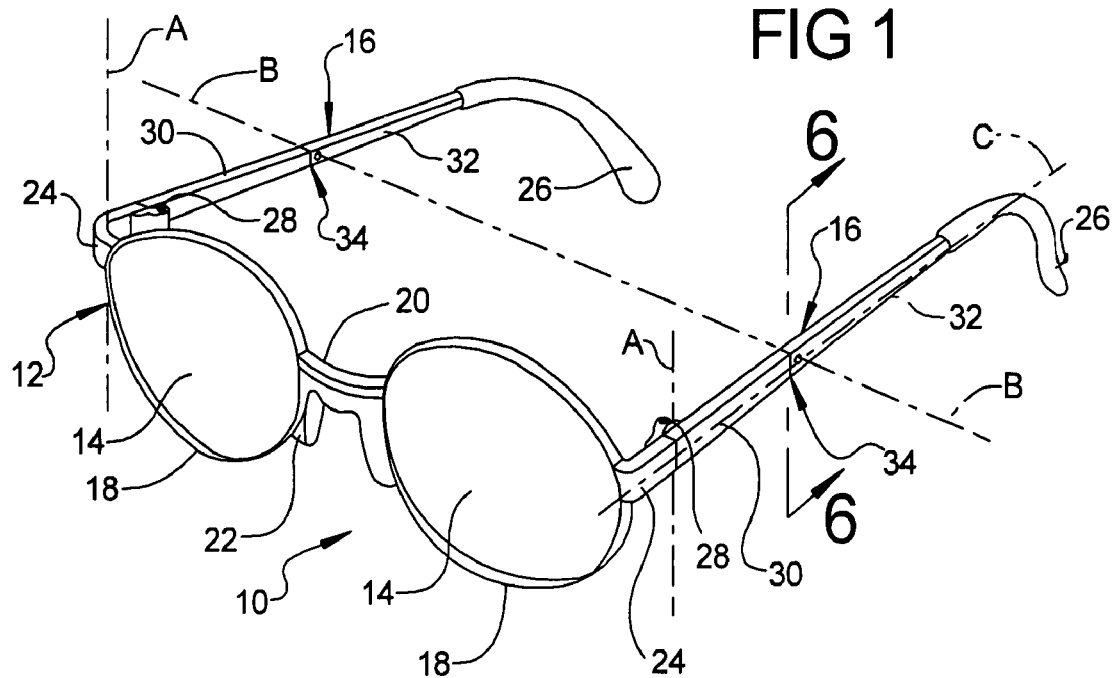
FIG. 1 is a perspective view of an eyeglass having two temples with each temple embodying a mid-temple hinge structure of the present invention.

Turning now to the drawings, FIG. 1 is a perspective view of an eyeglass, generally indicated at 10, which comprises a frame 12, a pair of lenses 14 mounted in side-by-side relation in the frame, and a pair of temples 16. According to this invention, and referring to FIGS. 7A, 7B, 8A, and 8B, the eyeglass 10 is adapted to be worn on the head "H" of a human with the temples engaging the ears "E" of the wearer. Importantly, the eyeglass 10 may be adjusted by the wearer wherein to place the frame 12 and the lenses 14 thereof in a first position, with the lenses positioned in front of the wearer's eyes "G", and in a second position, with frame 12 against the forehead "F" and the lenses 14 upwardly and away from the wearer's eyes.

The frame 12 may take many forms, known in the art. As shown in FIG. 1, the frame 12 is comprised of a one-piece body member and forms two lens retainers 18 and a bridge member 20 for joining the retainers to one another. In the embodiment shown, a contoured support 22 for supporting the frame 12 on the nose "N" of the wearer is associated with the bridge member 20. Depending on the application, the support 22 may be integral with the frame 12 or eliminated.

The temples 16 are mirror images of one another and each includes a forward end 24 and a rearward end 26, and each engages a side of the wearer's head. The forward end 24 is connected to a respective side of the frame 12 by hinge structure, indicated by the number 28. In use, the hinge structure 28 enables the forward end 24 of the temple 16 to pivot about an axis "A" and each of the temples 16 to rotate inwardly towards one another.

The rearward end 26 is, preferably, contoured and adapted to wrap around, at least in part, and engage or be supported by, an ear "E" of the wearer.

As shown in FIGS. 2-4, according to this invention, the temple 16 is formed into two parts or sections 30 and 32, which parts are interconnected to one another by a hinge structure, indicated at 34. The parts 30 and 32, respectively, provide mating end portions 36 and 38 that interlock with one another and, with the hinge structure 34, and form a bendable "knee" connection midway between the ends 24 and 26 of the temple 16.

The connection of the parts 30 and 32 is by a pin or fastener 40, the pin having a head 40a and threaded stem 40b. The pin 40 defines an axis "B" about which the mating end portions 36 and 38 of the temple parts 30 and 32 pivot.

The temples 16 are articulated and adapted to simultaneously bend. The joint or pin connection between each of the respective pairs of sections 30 and 32 enables the user to simultaneously adjust the temples 16 from an in use position wherein each of the temples are generally axially aligned along an axis "C" and the frame with lenses is proximate to the wearer's eyes, and in to a second position wherein each of the temples are angled and the frame with lenses is away from the wearer's eyes and seated atop the wearer's forehead.

The mating end portion 36 of the temple part 30 includes a thin generally planar plate or male member 42 having opposite planar surfaces 42a and 42b. Further, a bore 44c passes between the surfaces 42a and 42b, the bore 44c having a diameter slightly greater than the diameter of the threaded stem 40b and sized to pass the threaded stem therethrough.

The mating end portion 38 of the temple part 32 forms a U-shaped receptacle or socket 46 sized to receive the plate 42 when inserted therewithin. A base wall 48, an inner endwall 49, and a pair of sidewalls 50 form the socket 46, the endwall and sidewalls extending upwardly from the base wall. The sidewalls 50 are formed, in part, by a respective planar surface 52, interior to the socket 46, and a planar surface 54, exterior to the socket, the surfaces 52 being coextensive and in faced relation with one another.

One and the other sidewall 50 includes, respectively, a bore 44a and 44b to receive the fastener 40. The entry to the bore 44a is frusto-conical shaped to receive and flush mount the fastener head 40a relative to the surface 54 of the respective sidewall 50. The bore 44b is partially threaded to threadably engage and retain a free end portion of the stem 40b.

Importantly, as shown best in FIG. 3, the interior surfaces 52 angle towards one another wherein the lateral separation between the sidewalls 50 at the base wall 48 is greater than the lateral separation between the sidewalls 50 proximate to the opening, or at the upward projection of the sidewalls from the base wall. The forward and upper ends of the sidewalls 50 form a throat leading into the socket 46 for receiving the plate 42 and allowing the plate 42 of the temple part 30 to rotate upwardly and away from the base wall 48 and towards the temple part 32.

The interior surfaces 52 of the sidewalls 50 are preferably at an angle "Θ" of about 5° to 10° relative to a vertical to the base 48. As such, the upward end portions of the interior surfaces 52 of the sidewalls 50 complete a frictional engagement with the opposite surfaces 42a and 42b of the plate 42 to retain the temple parts 30 and 32 in the first position (See FIGS. 1, 4, 6, and 7A-7B) and also in the second position (See FIGS. 5, and 8A-8B).

Importantly, for desired placement, the frictional engagement is such as to permit the plate 42 to be frictionally engaged and held in whatever position the plate is pivoted.

Optionally, the outer surfaces 42a and 42b of the plate may also be angled towards one another, from the bottom to the top of the part 32. Such angle would be complementary with the angled surfaces 52 wherein to increase the frictional engagement between the temple parts 30 and 32.

Importantly, for desired orientation of the articulated temple parts 30 and 32, the frictional engagement between the plate and socket walls is such as to hold in the parts in any desired angle, whether axially aligned (FIG. 1) and in the in use position, or at the maximum angle permitted between the sections and in the stored position (FIGS. 8A and 8B), or at a position therebetween.

Additionally, the fastener 40 may be adjusted in a manner that the sidewalls 50 are driven towards one another, whereupon the interior surfaces 52 thereof will increase their frictional retaining grip with the opposite sides of the plate 42. In such manner, the temple sections 30a and 32 may be maintained at a desired angle to one another.

The forward end portion of the plate 42 is somewhat V-shaped and includes an angled first end face 42d, a transverse second end face 42e, and an angled third end face 42f. The relation of the end faces 42d, 42e, and 42f and the base wall 48 and end wall 49 of the socket 46 when the temple parts 20 and 32 are in the first and second positions are shown, respectively, in FIGS. 4-5.

As seen in FIG. 4, the base wall 48 forms a limit or stop member for positioning the plate 42 and the temple parts 30 and 32 relative to one another. The base wall 48 engages the lower edge of the plate 42 when the parts 30 and 32 are in the first or axially aligned position. As seen in FIG. 5, the parts 30 and 32 may rotate in a clockwise direction relative to the pin connection at 40. However, the base wall prevents counterclockwise rotation of the parts 30 and 32 relative to the pin at 40.

The hinge connection 34 between the temple parts or sections 30 and 32 form a knee connection that enables the temple parts to pivot relative to their pin connection to one another, and the frame 12 and associated lenses 14 to pivot relative to the ear engaging portion 26. As illustrated in FIGS. 1 and 5, the temple sections 30 and 32 are generally elongated and disposed along an axis. In the first position, the axes are generally aligned with one another. When the sections 30 and 32 pivot relative to the pin 40, the axes are about 160° to 170° to one another.

Preferably, the hinge connection 34 is substantially at the mid-point of the temple 16. However, depending on the fitment desired, and the shape of the head, the hinge connection 34 may be closer to (or further away from) the hinges 24 for mounting the temples 16 to the frame 12. If the temple sections are. substantially different in length, the pin connection and pivot angle of the knee will differ than that described.

Figure 7A:
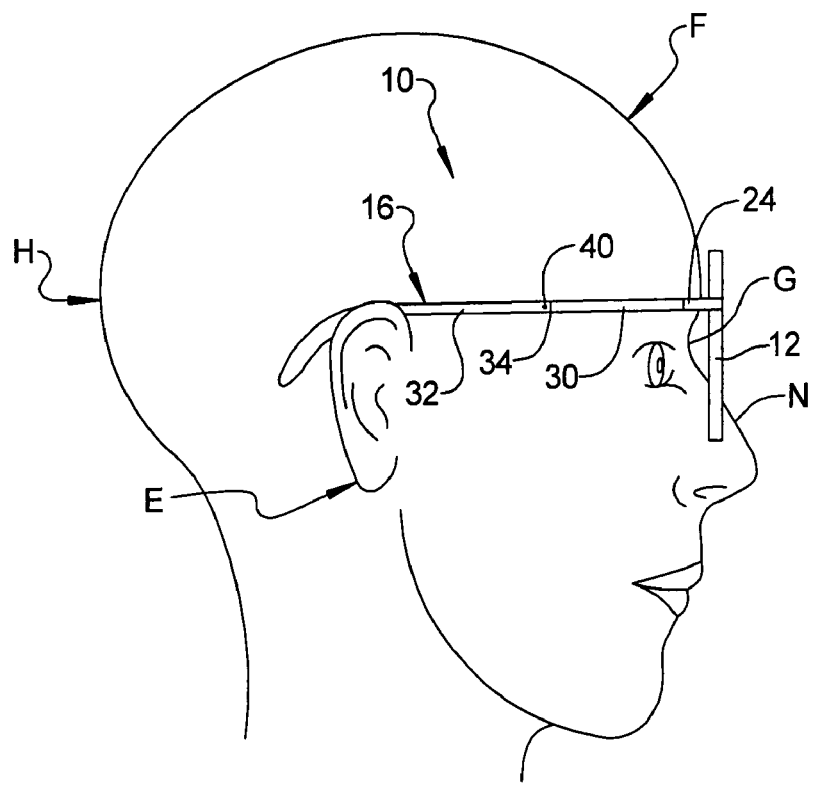
FIGS. 7A and 7B are, respectively, side and front views of a human head and the eyeglass of FIG. 1 when worn on the head and the temples are in the first position.
Figure 7B:
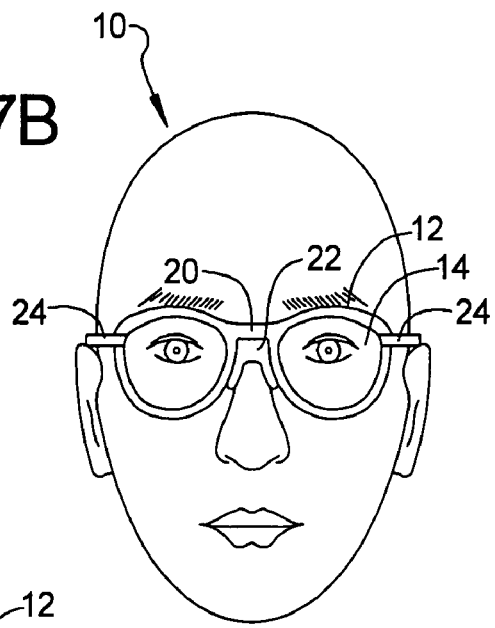
Figure 8A:
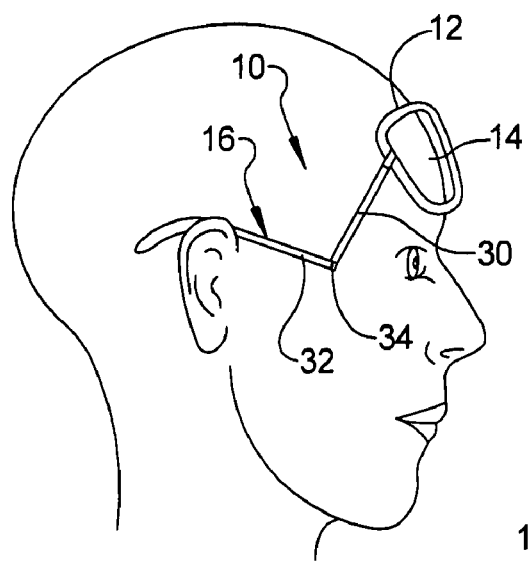
FIGS. 8A and 8B are, respectively, side and front views of the human head and the eyeglass of FIG. 1 when worn on the head and the temples are in the second position.
Figure 8B:
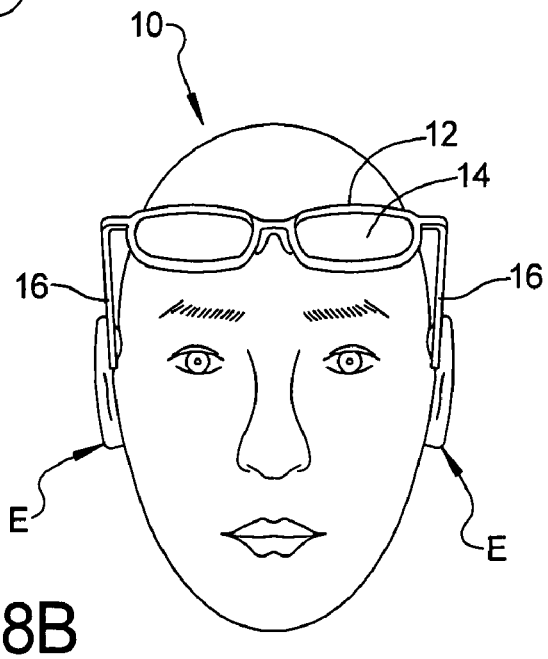

The wearing of the eyeglass 10 on the head of a user is illustrated in FIGS. 7A and 7B and in FIGS. 8A and 8B.

In FIGS. 7A and 7B, the frame 12 is in the first position. The temples 16 are substantially straight, extend along and engage a respective side of the head "H", the contoured end portions 26 wrap about a respective ear "E", and the frame 12 and lenses 14 retained therein are juxtaposed with the eyes "G". The temple parts 30 and 32 are substantially aligned along a central longitudinal axis.

In FIGS. 8A and 8B, when the user wishes to move the lenses 14 away from the eyes "G", the temples 16 are bent relative to the their mid-temple hinge connection 34, resulting in the temple parts 30 and 32 of the temples pivoting relative to their pins 40 and the temple parts 30 and 32 folding towards one another. The hinge connections 34 and hinge pins 40 thereof move downwardly, the temple end portions 24 rotate slightly relative to their respective ear connection, and the frame and lenses therein move upwardly and into a stored relation against the forehead "F".

The frictional engagement between the interior surfaces 52 of the sidewalls 50 and surfaces 42a and 42b of the plate 42 enhances the ability of the eyeglass 10, once adjusted in the manner described, to retain a desired shape and position the lenses and retainer frame 12, in either of the two positions.

While a frictional engagement is shown, a detent and projection may operate between the plate and sidewalls.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

Having thus described the invention what is claimed is:

1. An eyeglass structure adapted to be worn on a human head, comprising:
   a lens frame having laterally disposed first and second sides, and a medial bridge for supporting the frame on the nose and juxtaposing the lenses in the frame with the eyes of the wearer,
   a first and second temple member, each said temple member being articulated and including a forward section having a forward end portion and a mating end portion and a rearward section having a mating end portion and a rearward end portion, and
   means for hingedly connecting the forward end portions to the respective sides of the frame in a manner that the temple members may pivot relative to the frame and towards and away from one another,
   each said temple member including
   a hinge structure for pivotably connecting the mating end portions thereof to one another and in a manner that the sections may rotate towards and away from one another and between an in use position wherein the sections are axially aligned with one another and the frame and lenses therein is juxtaposed with the eyes and a stored position wherein the sections are at an angle to one another and the frame and lenses therein is rotated above and away from the eyes and seated against the forehead, said hinge structure comprising one and the other mating end portion comprising an elongated upwardly open socket having a U-shaped cross-section extending axially inward from the end of said one mating end portion, the U-shaped cross-section being formed by a base wall and a pair of opposed first sidewalls extending longitudinally, an elongated male member extending axially inward from the end of said other mating end portion, said male member having a pair of lateral second sidewalls extending longitudinally and adapted to seat within the socket in a manner that the first and second sidewalls frictionally engage with one another to resist rotation of the male member relative to the socket, and a pivot pin connecting the male member for rotation relative to the socket.

2. The eyeglass structure of claim 1, wherein the hinge structure is medially of the temple member.

3. The eyeglass structure of claim 1, wherein the first sidewalls of the socket converge upwardly from the base wall and towards one another to form an upwardly open narrowed throat, and the second sidewalls of the male member form an elongated plate of generally uniform width, the surfaces of the sidewalls being substantially planar and frictionally engaging one another to maintain the forward and rearward sections in a desired angle relative to one another.

4. The eyeglass structure of claim 3, and further wherein the socket terminates in an end wall, the endwall projecting upwardly from the base-wall, and the elongated plate has a shaped end formed by a first, second, third, and fourth edge, the edges cooperating with the base wall and the end wall of the socket to limit rotation between the forward and rearward sections and define the in use and stored positions, the first and third edges being at right angles to one another and adapted to engage the base wall and end wall to axially align the forward and rearward sections into the in use position, and the second and fourth edges being at an angle to the first and third edges and adapted to engage the base wall and the end wall to position the rearward section at an angle to the forward section and establish the stored position of the male member relative to the socket.

5. The eyeglass structure of claim 3, wherein the first sidewalls are at an angle of about 5° relative to a vertical extending from the base wall of the socket.

6. The eyeglass structure of claim 1, further comprising means for increasing the frictional engagement between the surfaces forming the sidewalls of the socket and the male member.

7. The eyeglass structure of claim 6, wherein said means for increasing the frictional engagement comprises the pivot pin having a head portion and a threaded end, the pin being adapted to pass through the sidewalls of the socket and the male member in a manner that head and threaded end, respectively, engage and are threadably connected to the socket and force the sidewalls towards one another.

8. The eyeglass structure of claim 1, wherein the forward and rearward sections are axially elongated and each has a central axis, the central axes being aligned to form a common longitudinal axis when the sections are in the in use position and at an obtuse angle of about 160° to 170° and forming a knee when the sections are in the stored position.

9. An eyeglass worn on the head of a user, the eyeglass comprising a lens frame, a pair of articulated temple arms, each said temple arm having forward and rearward end portions and a mid-temple hinge, the forward ends of the respective temple arms being pinned to the frame to permit the temple arms to rotate relative to a first axis towards and away from one another, and said mid-temple hinge permitting the temple arm to bend about its midpoint and the eyeglass lens frame to be moved upwardly and away from normal relationship with the eyes of the wearer and into a stored position seated on the forehead of the user, the mid-temple hinge comprising one end portion terminating in an axially elongated upwardly open U-shaped socket, the other end portion terminating in an axially elongated plate member that seats within the socket, the socket including a base wall and an opposed pair of longitudinally extending second sidewalls that extend upwardly from the base wall, the elongated plate member having a pair of lateral longitudinally extending first sidewalls and a top and bottom edge, and a pin extending between the sidewalls and connecting the plate member for rotation relative to the socket, the base wall and the bottom edge engaging with one another to define the normal relationship, and the plate member and the socket being dimensioned such that the first and second sidewalls frictionally engage with one another to inhibit but permit desired relative rotation therebetween.

10. The eyeglass of claim 9, further wherein said first and second sidewalls maintain the forward and rearward portion in a desired position.

11. The eyeglass of claim 9, wherein said first sidewalls are juxtaposed with respective of the second sidewalls, and said second sidewalls converge towards one another to form a narrow opening sized to pass the plate member, and the first sidewalls frictionally engage with respective of the second sidewalls to resist relative rotation therebetween.

12. The eyeglass of claim 11, wherein the pin passes through the plate member and threadably connects the second sidewalls to one another and the plate in the socket, threadable rotation of the pin drawing the second sidewalls together and into tighter frictional engagement with the first sidewalls of the plate member.

13. The eyeglass of claim 9, wherein for each said temple member the forward and rearward end portions are axially elongated and dimensioned to enable the end portions to rotate relative to to their pin connection by an amount sufficient to rotate the frame away from juxtaposed relation with the eyes and seated on the forehead of the wearer.

14. The eyeglass of claim 9, wherein said socket includes an end wall, said end wall projecting upwardly from said base wall and between said second sidewalls, and said plate member includes a second, third and fourth edge, the third edge forming the end of the plate member and adapted to engage the end wall when the plate member is in the normal position and the bottom edge is engaging the base wall of the socket, and the second and fourth edges, respectively, being adapted to engage the base wall and the end wall to limit rotation between the arm portions and position frame in the stored position.

15. In an adjustable eyeglass frame having opposite sides and a pair of temple members, each said temple member having first and second ends with the first ends hingedly connected to a respective side of the frame for rotation about a first axis and towards and away from the other temple member, the frame positionable on the head of a wearer and in front of the eyes of the user and the second ends positionable on a respective ear of the wearer, an improvement comprising means for adjusting the position of the eyeglass frame relative to the head of the wearer, the improvement wherein each said temple member comprises:

forward and rearward end sections, means for joining the sections together for rotation about a second axis transverse to the first axis thereof, said means for joining the section enabling the rearward section to rotate between first and second positions, respectively, wherein the rearward section is aligned with the forward section and the frame positioned with the eyes and at an angle to the forward end section and the frame rotated away from the eyes, and means for maintaining the rearward end section at a desired angle relative to the forward end section, said means for maintaining comprising the first and second ends each having a pair of longitudinally extending sidewalls, a pin for connecting the ends to one another in a manner that the sidewalls of the first end are juxtaposed with and in frictional engagement with the sidewalls of the second end.

* * * * *